(No Model.)

W. C. DUNN.
BICYCLE.

No. 551,667. Patented Dec. 17, 1895.

Witnesses:
Albert B Blackwood
Carleton E Snell

Inventor:
William C. Dunn
by J. H. Soulé and Co.
Attorney.

UNITED STATES PATENT OFFICE.

WILLIAM C. DUNN, OF LOGANSPORT, INDIANA.

BICYCLE.

SPECIFICATION forming part of Letters Patent No. 551,667, dated December 17, 1895.

Application filed September 4, 1894. Serial No. 522,053. (No model.)

*To all whom it may concern:*

Be it known that I, WILLIAM C. DUNN, a citizen of the United States, residing at Logansport, in the county of Cass and State of Indiana, have invented certain new and useful Improvements in Bicycles; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to bicycles of the ordinary "safety" pattern, and the object of the invention is to enable the hands as well as the feet to be effectively used in propelling the machine. Numerous constructions heretofore devised and patented have had this same object in view; but they have not been satisfactory and have not come into any considerable use. In fact, a bicycle so propelled is very seldom made or used, and the appearance of a machine so propelled would be regarded as a curiosity at the present time.

The present invention is designed to produce a bicycle of that character which will be practical in construction and use.

In the machine contemplated by the invention a movement of the handle-bars through suitable connections with the drive-wheel assists the pedals in driving the machine.

The invention consists in the features of construction hereinafter described and claimed.

The accompanying drawings illustrate the invention.

Figure 1:
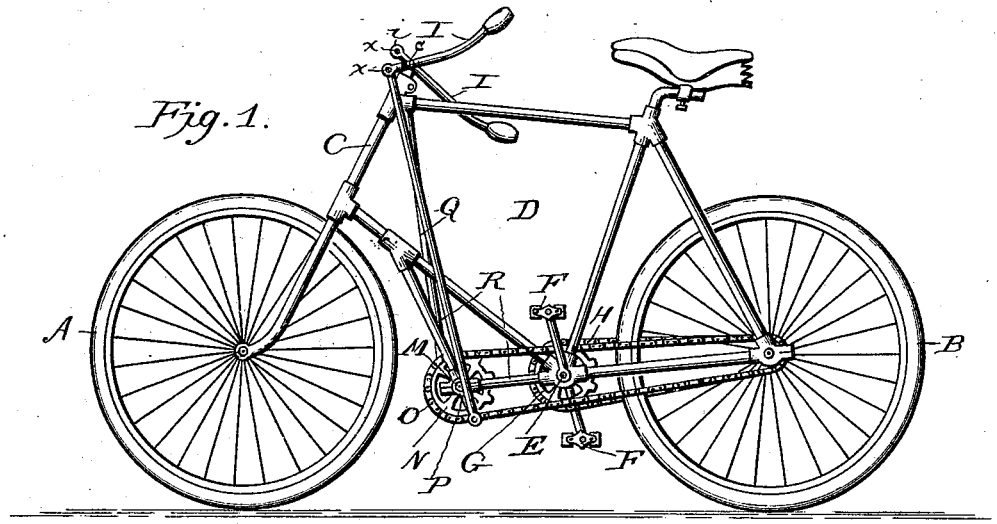
Figure 2:
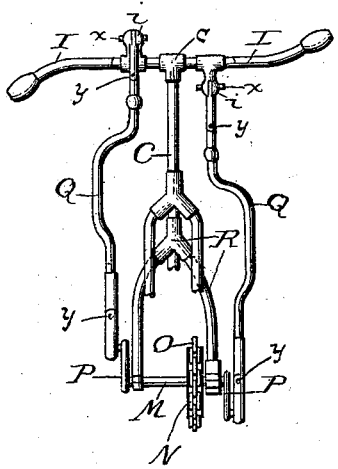
Figure 3:
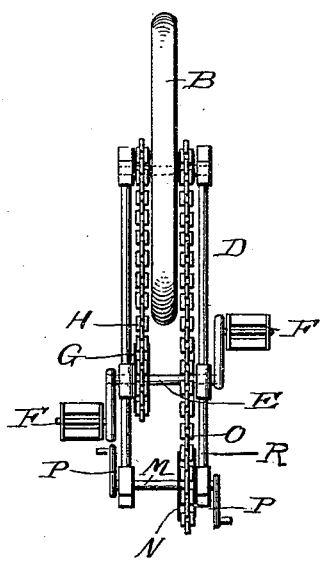

Figure 1 is a side elevation of a bicycle embodying the improvements. Fig. 2 is a front elevation showing the steering-head, handle-bars, and a portion of the improvements, but omitting the front wheel of the machine. Fig. 3 is a bottom elevation of the drive-wheel, power-shafts, and driving-chains.

The bicycle illustrated in the drawings has the usual front wheel A, rear wheel B, and steering-head C, a frame D of ordinary pattern connecting the steering-head with the rear wheel and carrying the saddle, and the usual pedal-shaft E, carrying the pedals F and sprocket-wheel G and connected with the rear wheel by the driving-chain H.

The mechanism embodying the present improvements consists in a second power-shaft M, parallel with the pedal-shaft and carrying a similar sprocket-wheel N, a second driving-chain O, connecting said sprocket-wheel N of shaft M with the rear or drive wheel of the machine, cranks P P on said shaft M corresponding to the pedal-cranks, and connecting-rods Q Q between said cranks P P and the handle-bars I of the machine, whereby shaft M is driven by manipulation of said handle-bars. The shaft M is supported directly in front of the pedal-shaft E by a supporting-frame R, secured to and forming a part of the main frame D, as shown. The sprocket-wheel N on shaft M is located at the opposite side of the frame of the machine from the sprocket-wheel on the pedal-shaft, and the second driving-chain O therefore extends on the opposite side of the frame from the chain H, the two driving-chains extending parallel with each other and acting upon the drive-wheel B at opposite sides thereof. (See Fig. 3.)

The handle-bars I I are mounted independently of each other, each being rotatably mounted at its inner end at the top $c$ of the steering-head C. (See Fig. 2.) Each handle-bar is cranked or bent inwardly toward the rider's seat, as shown, and the mounting of the handle-bars is such that a vertical movement of either handle-bar at its outer end will turn the handle-bar axially within its bearing $c$. The handle-bars I carry rigidly near their inner ends the forwardly-projecting lever-arms $i\ i$, to which the upper ends of the connecting-bars Q are pivoted at $x$, said bars Q being pivoted at their lower ends to the cranks P of shaft M. By this means the operation of the handle-bars effects the rotation of the crank-shaft M, the motion of the handle-bars being communicated to said shaft by the lever-arms $i$, connecting-rods Q, and cranks P. Each handle-bar I, with its lever-arm $i$, constitutes in use a lever whose fulcrum is at $c$, power at the extremity of the handle-bar, and weight at $x$.

In order that the connection of the rods Q to the handle-bars may not interfere with the ordinary use of the handle-bars for guiding the machine, the rods are made laterally flexible, as by being jointed at $y\ y$, as shown in Fig. 2, so as to yield when the handle-bars are turned in steering. For the same purpose the joint $x$ may be made a universal or ball-and-socket joint, if desired, instead of a simple hinge-joint, as shown. Moreover, the connecting-rods Q are formed with lateral bends, as shown, Fig. 2, so as to avoid striking the frame of the machine in turning and so as to give the proper direct pull from arm $i$ to crank P.

The cranks P are placed upon their shaft directly opposite to the pedal-cranks—that is, each crank P extends from its shaft in a direction diametrically opposite to that in which the pedal-crank on the same side of the machine extends; but it will be noted that the upward movement of each crank P is effected by downward pressure upon its handle-bar, so that in propelling the machine each handle-bar is lifted at the moment when the pedal on the opposite side of the machine is depressed, and vice versa.

The arrangement of the mechanism is such that the movement of the hands corresponds with the action of the feet upon the pedals, so that no awkward or unnatural action is required of the rider. The entire weight of the body can be concentrated upon each propelling effort, because the movement upon the handle-bars as well as upon the pedals is in a vertical direction. The two power-shafts—namely, the pedal-shaft E and the crank-shaft M—are parallel with each other and both act directly upon the driving-wheel through similar driving connections, so that the power is applied to the best advantage to drive the machine. The added power attained from the hand-operated crank-shaft is such that it becomes entirely practicable to gear the driving-wheel to one hundred inches, thereby securing nearly double the speed which is obtainable with an ordinary bicycle geared to, say, sixty or seventy inches, with pedal-power only.

I am aware that hand-levers have heretofore been applied to velocipedes so as to assist in rotating the pedal-shaft, and I make no claim to any such construction. My invention provides a separate driving-shaft acted upon by the hand-levers, by which means I make practicable the use of manual driving mechanism on bicycles of the safety pattern, avoiding interference of the connecting-rods with the legs of the rider, providing for a more effective application of power, and giving to the hand-levers a direct independent connection with the drive-wheel.

I claim as my invention—

In a bicycle, the handle-levers on the steering head, and driving mechanism mounted on the bicycle frame and operated by said handle levers through suitable connections, said connections between said handle levers and said driving mechanism including a universal joint to permit said hand-levers to be used in steering, substantially as set forth.

In testimony whereof I affix my signature in presence of two witnesses.

WILLIAM C. DUNN.

Witnesses:
ANNA STRAIN,
W. W. WILSON.